United States Patent [19]

Bowes et al.

[11] 4,133,929
[45] Jan. 9, 1979

[54] IONICALLY MODIFIED CELLULOSE MATERIALS FOR REMOVAL OF HEAVY METAL IONS

[75] Inventors: Quentin Bowes, Rheinfelden; Jaroslav Haase, Riehen; Rudolf F. Wurster, Pfeffingen, all of Switzerland

[73] Assignee: Ciba-Geigy Corporation, Ardsley, N.Y.

[21] Appl. No.: 806,574

[22] Filed: Jun. 14, 1977

[30] Foreign Application Priority Data

Jun. 24, 1976 [CH] Switzerland ............... 8087/76

[51] Int. Cl.² ............... B32B 7/10; B05D 3/04; B05D 3/10
[52] U.S. Cl. ............... 428/260; 428/278; 428/288; 428/290; 428/407; 428/511; 427/342; 427/391; 427/392; 210/38 B; 536/30; 156/276; 260/29.2 N; 260/29.6 R
[58] Field of Search ............ 427/342; 210/38 B; 428/411, 288, 407, 290, 260, 278, 511; 536/30

[56] References Cited

U.S. PATENT DOCUMENTS

| 2,882,185 | 4/1959 | Valko et al. ............... 427/342 |
| 2,906,749 | 9/1959 | Schmidt et al. ............ 536/30 X |
| 3,083,118 | 3/1963 | Bridgeford ............... 427/342 |
| 3,720,562 | 3/1973 | Dreuch ............... 427/342 |

*Primary Examiner*—P. C. Ives
*Attorney, Agent, or Firm*—Edward McC. Roberts; Michael W. Glynn

[57] ABSTRACT

A cellulosic absorption material for the removal of heavy metal ions from fluids, which material contains at least one chelate-forming amino acid group which is bonded through the group of the formula

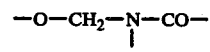

to the cellulose portion wherein the carbonyl group is linked to the chelate-forming radical and the oxygen is linked to the cellulose portion.

10 Claims, No Drawings

IONICALLY MODIFIED CELLULOSE MATERIALS FOR REMOVAL OF HEAVY METAL IONS

The present invention relates to ionically modified, chelate-forming, cellulosic adsorption materials which are suitable for removing or locking up heavy metal ions from fluids.

The novel cellulosic adsorption materials contain at least one chelate-forming amino acid group, preferably aminocarboxylic acid group, which is bonded through the group of the general formula

  (1)

to the cellulose portion, wherein the carbonyl group is linked to the chelate-forming radical and the oxygen atom is linked to the cellulose portion.

The ionic character of the modified cellulose materials of the present invention is based on the presence of complexing N-polycarboxylic acid anchor groups. As such chelate-forming groups which are bonded through the group of the formula (1), the cellulose materials contain for example aminoacetic acid (glycine), iminodiacetic acid, methylaminoacetic acid (sarcosine), methylaminopropionic acid, iminodipropionic acid, iminoacetic acid-propionic acid, aspartic acid, ethanolaminoacetic acid, vinylbenzyliminodiacetic acid or ethylenediamine-N,N'-dipropionic acid groups, which can also be in the form of their alkali metal salts, in particular sodium or potassium salts.

Preferred aminocarboxylic acid anchor groups are iminodiacetic acid and iminodipropionic acid groups.

The methylolamide and complexing anchor groups necessary for the chelate-forming modification of the cellulose materials can also be components of polymer compounds, such as polycondensates, polymers or polyadducts.

Such polymer compounds can have the general formula $$T \cdot E_n \quad (2)$$

wherein
T represents a polymer basic compound which contains at least one complexing N-carboxylic acid anchor group,
E represents a free or etherified methylolamide group, and
n is an integer of at least 1, for example from 1 to 200,000.

These polymer compounds can be derived from homopolymers, copolymers, graft polymers or block copolymers.

Suitable polymers for introducing the required chelate-forming anchor groups and methylolamide groups are basic polyamides which are obtained by condensation of dibasic carboxylic acids which contain 2 to 10 carbon atoms, for example adipic acid or the functional derivatives thereof, such as esters, amides or anhydrides, with polyamines, especially the polyalkylenepolyamines described for example in U.S. Pat. No. 2,882,185.

Interesting polymers are also the polyamidepolyamines which are obtained by reaction of polymerised, preferably di- to trimerised, fatty acids with polyamines.

Polymers of an alkylenimine having 2 to 4 carbon atoms which have an average molecular weight of 500 to 200,000, preferably 10,000 to 50,000, can also be used in the manufacture of the chelate-forming, anionically modified cellulose materials. These polymers normally have a Brookfield viscosity at 20° C. of 500 to 20,000 centipoise. Suitable alkylenimines are in particular ethylenimine, propylenimine, 1,2-butylenimine and 2,3-butylenimine. The most preferred alkylenimine of all is ethylenimine. The methylolamide group can be introduced, for example, by reaction of the polyalkylenimine with chloroacetamide and subsequent methylolation. The chelate-forming anchor group can be introduced by reacting the polyalkylenimine with a haloacetic acid or an alkali metal salt thereof.

Suitable polymers are also addition polymers and copolymers, for example optionally quaternised copolymers from basically substituted maleinimides, acrylates, acrylamides, vinylpyridine and ethylenically unsaturated comonomers.

Furthermore, polymers which contain methylolated urea, urethane, amidine and guanidine groups can be used for modifying the cellulose materials.

It is particularly advantageous if the cellulose materials are ionically modified with a monomeric compound which contains at least one chelate-forming aminocarboxylic group and at least one N-methylolamide group, in particular a N-methylolcarboxamide group.

According to the invention, useful monomeric compounds with a chelate-forming anchor group and an N-methylolcarboxamide group are the free or etherified methylol compounds of the general formula

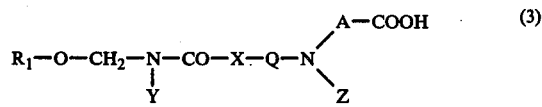  (3)

wherein
Y represents hydrogen, lower alkyl or —CH$_2$-O-R$_2$,
X represents the direct bond, —O—, —S— or

, each of
R$_1$, R$_2$ and R$_3$ independently represents hydrogen or lower alkyl,
Q represents a C$_1$-C$_8$-alkylene or phenylene-C$_1$-C$_4$-alkylene radical which is unsubstituted or substituted by lower alkyl or phenyl,
Z represents lower alkyl, —B—COOH or the group of the formula

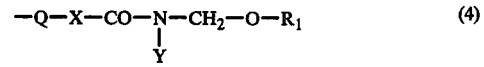  (4)

each of
A and B independently represents C$_1$-C$_8$-alkylene which is unsubstituted or substituted by lower alkyl, lower alkoxy or phenyl.

Methylol compounds of the formula (3), which contain only a single group of the formula (4), are especially preferred. X is in particular the direct bond and Y is preferably hydrogen.

Such methylol compounds of the formula (3) can be obtained by reaction of an aliphatic or araliphatic aminocarboxylic acid with an amide of a 1,2-unsaturated aliphatic carboxylic acid or with a haloacetamide and methylolation of the reaction product with formaldehyde or a formaldehyde donor, for example paraformaldehyde or trioxane. Suitable aminocarboxylic or iminocarboxylic acids for this reaction are in particular glycine, iminodiacetic acid, sarcosine, alanine, iminodipropionic acid, iminoacetic acid-propionic acid or aspartic acid or the alkali metal salts thereof, and suitable amides are acrylamide, maleindiamide or chloroacetamide.

Preferred chelate-forming, ionically modified cellulose materials can be obtained by carrying out the modification with a free or etherified methylol compound of the general formula

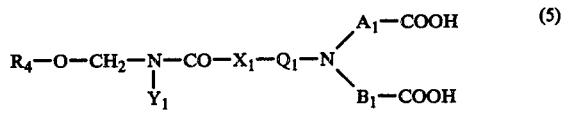

wherein
$Y_1$ represents hydrogen or $-CH_2-O-R_5$, each of
$R_4$ and $R_5$ represents hydrogen or methyl,
$X_1$ represents the direct bond or $-NH-$,
$Q_1$ represents $C_1-C_5$-alkylene or phenylene-$C_1-C_3$-alkylene, and each of
$A_1$ and $B_1$ represents methylene or ethylene.

Preferred methylol compounds of the formula (5) are those wherein each of $R_4$ and $Y_1$ represents hydrogen and $X_1$ represents the direct bond, and have the formula

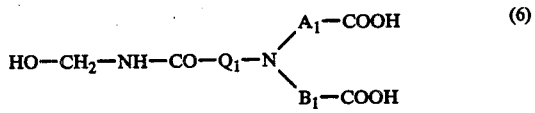

wherein $Q_1$, $A_1$ and $B_1$ have the given meanings. $Q_1$ represents in particular methylene or ethylene.

It is likewise possible to use polymer compounds which contain recurring units of the formulae

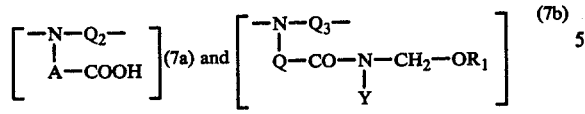

in the macromolecular skeleton, and also block copolymers of the formula

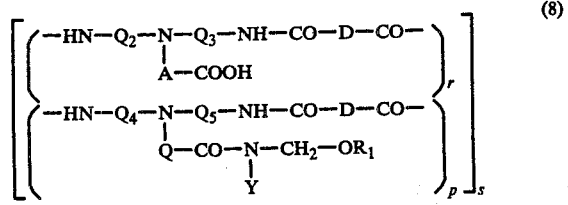

for modifying the cellulose materials.

In the formulae (7a), (7b) and (8), each of the symbols $Q_2$, $Q_3$, $Q_4$ and $Q_5$ independently represents a straight chain or branched alkylene radical of 2 to 8 carbon atoms, $-CO-D-CO-$ represents the radical of a polybasic carboxylic acid, in particular the radical of a saturated or unsaturated aliphatic dicarboxylic acid or the radical of an aromatic dicarboxylic acid, such as terephthalic or isoterephthalic acid or of naphthalene-2,6-dicarboxylic acid, each of r and p represents an integer from 1 to 10,000,
s represents an integer from 1 to 10, and
A, Q, Y and $R_1$ have the given meanings.

In the definition of the radicals of the compounds of the formulae (3) to (6) which are suitable for modifying the cellulose materials and of the recurring units of the formulae (7a), (7b) and (8), lower alkyl and lower alkoxy normally denote those groups which contain 1 to 5, in particular 1 to 3, carbon atoms, for example methyl, ethyl, n-propyl, isopropyl, n-butyl, sec.-butyl or amyl and methoxy, ethoxy or isopropoxy. Halogen in connection with all the above substituents is for example fluorine, bromine or, preferably, chlorine.

The ionic modification is effected as a rule by treating, for example impregnating, the cellulose materials with the methylol compound or mixtures thereof in an acid medium, for example at a pH value of 2 to 6, and thermofixing the treated cellulose materials, advantageously at temperatures between 20° and 200° C., preferably between 50° and 150° C., until the product is dry. If desired or necessary, a catalyst can be used for fixation. Examples of suitable catalysts are: ammonium rhodanide, ammonium chloride, ammonium dihydrogen orthophosphate, magnesium chloride, maleic acid, tartaric acid or citric acid.

The ionic methylol compounds can also be etherified with an alkanol having not more than 4 carbon atoms, for example with ethanol, propanol, butanol or, in particular, methanol, or also esterified with a carboxylic acid having not more than 4 carbon atoms, for example acetic acid.

The cellulosic materials to be used for the ionic modification are for example bleached or unbleached pine sulphite cellulose, kraft cellulose, paper, cardboard products, waste paper, textile fibres of cotton, staple fibres, jute, ramie, hemp, linen, viscose, as well as peat, wood pulp, sawdust, wood fibre, wood flour, cork powder, bark, or tailings. These cellulose materials are advantageously converted into a form which is suitable for the treatment with the methylol compound. The cellulose can be in the form of granules, filter paper, blotting paper or pulp.

The ionically modified cellulose material of the present invention is suitable chiefly for removing or "locking up" heavy metal ions. The efficiency of the novel adsorption agent is significantly greater than that obtained with the conventional adsorption agents. The adsorption agent of the present invention can reduce the metal content in effluents to virtually negligible amounts of 2.5 ppm, in many cases even 0.1 ppm, so that the treated effluent can be discharged as free from heavy metals.

Among the effluents to be treated with the ionically modified cellulose materials of the invention are various industrial effluents which contain ions of metals with a standard potential normally greater than $-1.5$ V, preferably between $-1$ and $+0.85$ V, at 25° C. Examples of such metal ions are: $Cd^{++}$, $Cu^{++}$, $Ni^{++}$, $Sn^{++}$, $Pb^{++}$, $Hg^{++}$, $Ag^+$, $Fe^{+++}$, $Cr^{+++}$ and $Co^{+++}$.

The removal of the metal ions is preferably carried out at a temperature between 10° and 100° C. Preferably, however, it is carried out between 20° and 70° C. If desired, the purification of the effluents can also be effected under pressure or in vacuo. The pH value of the effluents can vary within wide limits, for example between 2 and 12. However, depending on the nature of the modified cellulose material used as adsorption agent, pH corrections, for example to a value of 2 to 9, in particular 3 to 6, can ease or speed up the purification process.

The treatment of the effluents can be carried out discontinuously, semi-continuously, or continuously. In principle, the following methods are suitable within the purport of the invention:
(a) the stirring process, in which the water to be purified is stirred in a vessel, or series of vessels, with the cellulose material and then the two are separated;
(b) the fluidised bed process, in which the cellulose material is kept in suspension through the flow of the liquor to be purified;
(c) the fixed bed process, in which the liquor to be purified is conducted through a filter-like cellulose material.

If the last of these three possibilities, the fixed bed process c), is used, then the following three variants in respect of the apparatus used are chiefly suitable:
(1) The treatment apparatus, e.g. dyeing machine, is firmly connected to the adsorber installation.
(2) The adsorber installation is movable and can be coupled as required with any treatment apparatus.
(3) The effluents originating from the treatment liquors are combined in a suitable container and then jointly conducted through the cellulose material.

The amount of ionically modified cellulose material to be used for removing the metal ions can vary considerably, depending on the nature of the metal ions to be removed. Up to 95–100% of the metal ions can be removed by appropriate choice of the cellulose material. Where a complete removal of the metal ions by a single treatment of the effluents with the cellulose material proves unsuccessful, it is advisable to repeat the purification operation.

The invention is illustrated by the following Examples, in which the percentages are by weight.

EXAMPLE 1

(a) 71 g of acrylamide, 177 g of iminodiacetic acid and 0.01 g of N-nitrosophenylhydroxylamine are dissolved in 500 ml of water and the solution is kept for 5 hours at 60° C., during which time the pH value falls from 12.2 to 9.1. The solution is then cooled to 20° C. and treated with 130 ml of hydrochloric acid, whereupon a precipitate is obtained. This precipitate is collected by filtration and recrystallised from water, giving a compound of the formula $$(HOOC-CH_2)_2 N - CH_2CH_2CONH_2 \quad (11)$$

with a melting point of 195° C.

Analysis: $C_7H_{12}N_2O_5$; found: C 40.9; H 5.94; N 13.53%; calculated: C 41.17; H 5.92; N 13.72%.

(b) 40.8 g of the amide compound of the formula (11) prepared in accordance with a) are dissolved in 300 ml of water and this solution is treated with 17.81 g of a 36.6% formaldehyde solution. The reaction solution is heated to 40° C. and kept for 2 hours at pH 10.5 by adding sodium hydroxide solution until the content of free formaldehyde, corresponding to a degree of methylolation of 84%, is 0.34%. An aqueous solution of the methylol compound of the formula

$$(HOOC-CH_2)_2 N - CH_2CH_2CONH - CH_2OH \quad (12)$$

is obtained. This solution is adjusted to pH 3 with 37% hydrochloric acid.

(c) 9.42 g of filter paper (surface weight: 100 g/m²) are impregnated with the acid solution prepared in accordance with b) to a pick-up of 21.4 g of this solution. The impregnated paper is kept for 10 minutes at 140° C., then washed with water and dried. The nitrogen content of this fibrous adsorption material is 0.6%.

EXAMPLE 2

(a) 40.8 g of the amide compound of the formula (11) prepared in accordance with Example 1 a) are dissolved in 300 ml of water and this solution is treated with a 36.6% formaldehyde solution. The reaction mixture is heated to 40° C. and kept for 2 hours at pH 10.5 by adding sodium hydroxide solution. An aqueous solution of the methylol compound of the formula

$$(HOOC-CH_2)_2 N - CH_2CH_2CON(CH_2OH)_2 \quad (13)$$

is obtained. This solution is adjusted to pH 3 with 37% hydrochloric acid.

(b) 8.47 g of filter paper (surface weight: 100 g/m²) are impregnated with the acid solution prepared in accordance with a) to a pick-up of 20.17 g of this solution. The impregnated paper is kept for 10 minutes at 140° C., then washed and dried. The nitrogen content of this fibrous adsorption material is 0.91%.

EXAMPLE 3

(a) 46.8 g of the methylol compound of the formula (12) prepared in accordance with Example 1 b) are dissolved in 200 ml of water and this solution is treated with 79.2 g of methanol. The reaction solution is warmed to 35° C. and kept for 2 hours at pH 3 by adding 37% hydrochloric acid. The solution is then cooled to 25° C., giving an aqueous solution of the ether of the formula

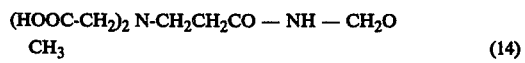
$$(HOOC-CH_2)_2 N-CH_2CH_2CO-NH-CH_2O\underset{CH_3}{} \quad (14)$$

(b) 7.98 g of filter paper (surface weight: 100 g/m²) are impregnated with the acid solution prepared in accordance with a) to a pick-up of 14.44 g of this solution. The impregnated paper is kept for 10 minutes at 140° C., then washed with water and dried. The nitrogen content of this fibrous adsorption material is 1.13%.

EXAMPLE 4

(a) 93.5 g of chloroacetamide and 177 g of iminodiacetic acid are dissolved in 500 ml of water and the solution is kept for 5 hours at 60° C., while keeping the pH at 9 with a 10N sodium hydroxide solution. The solution is then cooled to 20° C. and treated with 120 ml of 37% hydrochloride acid, whereupon a precipitate is obtained. This precipitate is collected by filtration and recrystallised from water, affording a compound of the formula

$$(HOOC-CH_2)_2 N - CH_2 - CONH_2 \quad (15)$$

with a melting point of 208° C.

(b) 95 g of the amide compound of the formula (15) prepared in accordance with a) and 1 g of magnesium oxide are added to 200 ml of water and then 45 g of paraformaldehyde are added. The resultant suspension is heated to 98° C. and kept for 13.5 hours at a pH of 4. The suspension is then cooled and filtered, affording 44.2 g of a compound of the formula (HOOC — CH$_2$)$_2$ N — CH$_2$COON (CH$_2$OH)$_2$  (16)

as a white powder. The melting point of this compound is 237° C. A 40% aqueous solution of this compound is adjusted with 37% hydrochloric acid to pH 3.

(c) 8.15 g of filter paper (surface weight: 100 g/m$^2$) are impregnated with the acid solution prepared in accordance with b) to a pick-up of 14.75 g of this solution. The impregnated paper is kept for 10 minutes at 140° C., then washed with water and dried. The nitrogen content of this fibrous adsorption material is 0.84%.

EXAMPLE 5

(a) 123.5 g of N-hydroxymethylchloroacetamide and 177 g of iminodiacetic acid are dissolved in 600 ml of water and the solution is kept for 21 hours at 60° C. The pH is then adjusted to 9 with sodium hydroxide solution. The solution is thereafter cooled to 20° C. and adjusted to pH 3 with 110 ml of 37% hydrochloric acid, giving a compound of the formula (HOOC — CH$_2$)$_2$ N — CH$_2$ — CONH — CH$_2$OH  (17)

(b) 7.98 g of filter paper (surface weight: 100 g/m$^2$) are impregnated with the acid solution prepared in accordance with b) to a pick-up of 15.74 g of this solution. The impregnated paper is kept for 10 minutes at 140° C., then washed with water and dried. The nitrogen content of this fibrous adsorption material is 0.88%.

EXAMPLE 6

(a) 86 g of polyethylenimine (50%), with an average molecular weight of 30,000 to 40,000, are dissolved in 164 ml of water and the solution is treated, with stirring, at a temperature of 70°–80° C. with a solution of 58.3 g of sodium chloroacetate in 150 ml of water. After a reaction time of 3 hours, a solution of 46.8 g of chloroacetamide in 500 ml of water is added. Then 284 ml of water are distilled off from the reaction mixture under reduced pressure and 42.25 g of a 35% formaldehyde solution are stirred in, whereupon the pH is adjusted to 9 with 10N sodium hydroxide solution. The reaction mixture is then further stirred for 2 days at room temperature, affording 800 g of a viscous, yellowish solution of the polyethylenimine which contains iminoacetic acid and methylolamide groups.

(b) 9.42 g of filter paper (surface weight: 100 g/m$^2$) are impregnated with the acid solution prepared in accordance with (a) to a pick-up of 14.38 g of this solution. The impregnated paper is kept for 10 minutes at 140° C., then washed with water and dried. The nitrogen content of this fibrous adsorption material is 0.9%.

EXAMPLE 7

(a) 202 g of diethyl adipate and 267 g of tetraethylenepentamine are heated under nitrogen and with stirring to 160° C. After a reaction time of 18 hours, 372 g of a viscous brown substance are obtained. This polymer substance is cooled to 25° C., diluted with 1572 g of water and treated at a temperature of 80° C. with 72.4 g of 96% sodium chloroacetate, while the pH is kept for 4.5 hours at 9 with a 4N sodium hydroxide solution. Then 37.6 g of 99% chloroacetamide are added and the reaction mixture is stirred for a further hour while keeping the pH constant with 4N sodium hydroxide solution. Thereafter 780 ml of water are distilled off from the reaction mixture. After addition of 34.3 g of a 35% formaldehyde solution, the reaction mixture is stirred for a further 2 days at room temperature, yielding 1542 g of a clear brown solution of the polymer which contains carboxymethyl and methylolamide groups. This solution is adjusted to pH 3 with 214 ml of 37% hydrochloric acid.

(b) 9.19 g of filter paper (surface weight: 100 g/m$^2$) are impregnated with the acid solution prepared in accordance with a) to a pick-up of 20.3 g of this solution. The impregnated paper is then kept for 10 minutes at 140° C., then washed with water and dried. The nitrogen content of this adsorption material is 0.4%.

EXAMPLE 8

(a) A solution of 150 g of a polyamidepolyamine (prepared from polymerised linoleic acid/linolenic acid and triethylenetetramine), with an amino value of 350 to 400 mg KOH/g, in 1500 ml of water is heated with stirring to 80° C. and the solution is treated over the course of 3.5 hours with 50.3 g of 96% sodium chloroacetate, while the pH is kept at 9 with a sodium hydroxide solution. Then 38.6 g of 99% chloroacetamide are added and the pH is kept for a further 3.5 hours at 9 with a 10N sodium hydroxide solution. The reaction mixture is then cooled to 25° C. and after addition of 35.5 g of a 35% formaldehyde solution, further stirred for 2 days at room temperature while keeping the pH at 9, giving 1886 g of a brown viscous solution which is adjusted to pH 3 with 41 ml of concentrated hydrochloric acid.

(b) 9.50 g of filter paper (surface weight: 100 g/m$^2$) are impregnated with the acid solution prepared in accordance with a) to a pick-up of 28.50 g of this solution. The impregnated paper is then kept for 10 minutes at a temperature of 140° C. and subsequently washed and dried. The nitrogen content of of this adsorption agent is 0.33%.

EXAMPLE 9

20 liters of effluent from an after-coppering cotton dyeing which contains 45 ppm of Cu$^{++}$ as well as traces of a violet dye and has a pH of 3.5, are treated with 20 g of the anionically modified cellulose materials prepared in accordance with Example 1 and which are suspended in water beforehand. After a contact time of 10 minutes with stirring, the filtrate obtained after separation of the phases contains only 2.5 ppm of Cu$^{++}$.

EXAMPLE 10

1 liter of a solution which is adjusted to a pH of 3 and contains 50 mg of dissolved metal is charged into a stirrer reactor. The liquor is treated with 5 g of each of the modified cellulose materials prepared in accordance with Examples 1 to 5. In each test, a sample is taken after an adsorption time of 60 minutes and filtered through a folded filter. The corresponding metal concentrations reported in the table are ascertained.

TABLE

| Adsorbent prepared in accordance with Example | Residual metal concentrations in mg/1 after 60 minutes | | |
|---|---|---|---|
| | Hg | Cu | Zn |
| 1 | 30 | 2.6 | |
| 2 | 33 | 4 | |
| 3 | 3 | 3.2 | 13 |
| 4 | 6 | 3.6 | 7.2 |
| 5 | 5 | 2.5 | 7.1 |

What we claim is:

1. A cellulosic adsorption material for the removal of heavy metal ions which contains at least one chelate-forming amino acid group which is bonded through the group of the formula $$-O-CH_2-N-CO- \quad (1)$$
$$|$$

to the cellulose portion, wherein the carbonyl group is linked to the chelate-forming radical and the oxygen is linked to the cellulose portion.

2. An adsorption material according to claim 1 wherein the modified cellulose material contains as chelate-forming group a glycine, sarcosine, iminodiacetic acid, methylaminopropionic acid, iminodipropionic acid, iminoacetic acid-propionic acid, ethanolaminoacetic acid, vinylbenzyliminodiacetic acid or ethylenediamine-N,N'-dipropionic acid group, or the alkali metal salt form thereof.

3. An adsorption material according to claim 2 wherein the modified cellulose material contains an iminodiacetic acid or iminodipropionic acid group as chelate-forming group.

4. An adsorption material according to claim 1 wherein the chelate-forming component of the modified cellulose material is derived from a free or etherified methylol compound of the formula $$R_1-O-CH_2-N-CO-X-Q-N \begin{matrix} A-COOH \\ \\ Z \end{matrix} \quad (3)$$
$$\quad\quad\quad | \\ \quad\quad\quad Y$$

wherein
Y represents hydrogen, lower alkyl or $-CH_2-O-R_2$,
X represents the direct bond, $-O-$, $-S-$ or $$-N- \\ | \\ R_3 ,$$

each of
$R_1$, $R_2$ and $R_3$ independently represents hydrogen or lower alkyl,
Q represents a $C_1-C_8$-alkylene or phenylene-$C_1-C_4$-alkylene radical which is unsubstituted or substituted by lower alkyl or phenyl,
Z represents lower alkyl, $-B-COOH$ or the group of the formula $$-Q-X-CO-N-CH_2-O-R_1 \quad (4)$$
$$\quad\quad\quad\quad | \\ \quad\quad\quad\quad Y$$

each of

A and B independently represents $C_1-C_8$-alkylene which is unsubstituted or substituted by lower alkyl, lower alkoxy or phenyl.

5. An adsorption material according to claim 4 wherein the chelate-forming component of the modified cellulose material is derived from a free or etherified methylol compound of the general formula (3), wherein Z represents lower alkyl or $-B-COOH$.

6. An adsorption material according to claim 5 wherein the chelate-forming component of the modified cellulose material is derived from a free or etherified methylol compound of the formula $$R_4-O-CH_2-N-CO-X_1-Q_1-N \begin{matrix} A_1-COOH \\ \\ B_1-COOH \end{matrix} \quad (5)$$
$$\quad\quad\quad | \\ \quad\quad\quad Y_1$$

wherein
$Y_1$ represents hydrogen or $-CH_2-O-R_5$, each of
$R_4$ and $R_5$ represents hydrogen or methyl,
$X_1$ represents the direct bond or $-NH-$,
$Q_1$ represents $C_1-C_5$-alkylene or phenylene-$C_1-C_3$-alkylene, and each of
$A_1$ and $B_1$ represents methylene or ethylene.

7. An adsorption material according to claim 6 wherein the chelate-forming component of the modified cellulose material is derived from a methylol compound of the formula $$HO-CH_2-NH-CO-Q_1-N \begin{matrix} A_1-COOH \\ \\ B_1-COOH \end{matrix} \quad (6)$$

wherein $Q_1$, $A_1$ and $B_1$ have the meanings given in claim 6.

8. An adsorption material according to claim 7 wherein the chelate-forming component of the modified cellulose material is derived from a methylol compound of the formula (6), wherein each of $Q_1$, $A_1$ and $B_1$ independently represents methylene or ethylene.

9. An adsorption material according to claim 1 wherein the chelate-forming component of the modified cellulose material is derived from a polymer compound which contains recurring units of the formulae $$\left[ \begin{matrix} -N-Q_2- \\ | \\ A-COOH \end{matrix} \right] (7a) \text{ and } \left[ \begin{matrix} -N-Q_3- \\ | \\ Q-CO-N-CH_2-OR_1 \\ \quad\quad | \\ \quad\quad Y \end{matrix} \right] (7b)$$

wherein each of $Q_2$ and $Q_3$ independently represents straight chain or branched $C_2-C_8$-alkylene,
A represents $C_1-C_8$-alkylene which is unsubstituted or substituted by lower alkyl, lower alkoxy or phenyl,
Q represents a $C_1-C_8$-alkylene or phenylene-$C_1-C_4$-alkylene radical which is unsubstituted or substituted by lower alkyl or phenyl,
Y represents hydrogen, lower alkyl or $-CH_2-O-R_2$,
$R_1$ and $R_2$ independently represents hydrogen or lower alkyl.

10. An adsorption material according to claim 9 wherein the chelate-forming component of the modified cellulose material is derived from a polyalkylenimine which contains recurring units of the formulae (7a) and (7b) and has an average molecular weight of 500 to 200,000.

* * * * *